(12) United States Patent
Teshiba

(10) Patent No.: US 8,168,744 B2
(45) Date of Patent: May 1, 2012

(54) POLYIMIDE FILM FOR MOLDING, ITS MANUFACTURING METHOD AND MOLDING PRODUCT

(75) Inventor: Toshihiro Teshiba, Kuwana (JP)

(73) Assignee: E. I. du Pont de Nemours and Company, Wilmington, DE (US)

( * ) Notice: Subject to any disclaimer, the term of this patent is extended or adjusted under 35 U.S.C. 154(b) by 583 days.

(21) Appl. No.: 12/368,045

(22) Filed: Feb. 9, 2009

(65) Prior Publication Data

US 2009/0209725 A1 Aug. 20, 2009

Related U.S. Application Data

(60) Provisional application No. 61/066,266, filed on Feb. 19, 2008.

(51) Int. Cl.
*C08G 73/16* (2006.01)
*C08G 73/00* (2006.01)
*C08G 12/08* (2006.01)
*B29C 39/02* (2006.01)

(52) U.S. Cl. ........ 528/288; 528/229; 528/503; 264/232; 264/239; 264/319

(58) Field of Classification Search .................. 528/229, 528/288, 503; 264/232, 239, 319
See application file for complete search history.

(56) References Cited

U.S. PATENT DOCUMENTS 5,037,587 A * 8/1991 Saruwatari et al. .......... 264/466

FOREIGN PATENT DOCUMENTS

| JP | 5088481 A | 4/1993 |
| JP | 210887 A | 8/1994 |

* cited by examiner

*Primary Examiner* — Duc Truong

(57) ABSTRACT

To provide a polyimide film for molding that is light and has excellent surface smoothness, safety, moldability, heat resistance, and handleability and thus can be used as the reflector base material for illuminating devices.

The polyimide film for molding is made of a thermoplastic polyimide obtained from a reaction between an aromatic tetracarboxylic acid or its dianhydride and an aromatic diamine. The lowest viscoelasticity of storage elasticity (E') of viscoelasticity is 108 Pa or lower, and the tensile elongation at glass transition temperature (E") A is 150% or higher.

4 Claims, No Drawings

POLYIMIDE FILM FOR MOLDING, ITS MANUFACTURING METHOD AND MOLDING PRODUCT

This application claims benefit of 61/066,266 filed Feb. 19, 2008.

FIELD OF THE INVENTION

The present invention pertains to a moldable film that can be used as the base material for the reflectors of illuminating devices, such as, automobile headlights, dental mirrors, and surgical lamps. More specifically, the present invention is directed to certain polyimide based films and also to methods of manufacturing and molding such films.

BACKGROUND OF THE INVENTION

Both the: i. reflector portion of a headlight (e.g., front light) or a fog light of an automobile; and ii. the interference film reflector for medical uses (surgical light, dental mirror), are mainly formed by using aluminum, nickel, or nickel-chromium as the reflecting material and by forming an interference film by means of dichroic deposition on a reflector base material made of an injection molding body or compression molding body formed using glass, aluminum or other metals, and polyphenyl sulfide, unsaturated polyester resin, polyether imide, or other resins.

That is, a halogen bulb, xenon bulb, high luminance LED or other bulb are used as a light source for the reflector of a headlight (front light) or a fog light of automobile and the interference film reflector for medical uses (surgical light, dental mirror). Since the connection part of such light bulb may be heated to a temperature of 200° C. or higher, it uses an injection molding body or compression molding body of plastic with heat resistance that is improved by blending in metal that has no thermal deformation or glass fiber, calcium carbonate, or other inorganic reinforcer.

However, when glass is used as the reflector base material, it is heavy and easy to break. When metal and reinforcing resin molding body is used as the reflector base material, the weight is large. In addition, in order to improve the reflecting mirror performance (smoothness), it is necessary to perform resin coating or other secondary processing prior to depositing the reflecting material. As a result, the number of the manufacturing steps will be increased.

When a reinforced resin molding body is used as the reflector base material, the weight is relatively small compared with the case of using metal as the reflector base material. However, from the point of view of the strength of the base material and due to limitation of the molding technology, it is necessary to form the reflector base material in a fairly large thickness. As a result, the heat dissipating property of the base material becomes poor. For a projector type lamp having a structure in which heat is easy to accumulate, the heat resistance is unstable, which is undesired for retaining the shape. Also, heating in the housing will be accelerated, shortening the service life of the light bulb itself.

In addition, when a reinforced resin molding body is used as the reflector base material, gas of chlorine compound, etc. may be generated during heating when the lamp is turned on. Said gas will be condensed on the front lens or reflection surface of the headlight to form fog, which will lower the illuminance of the light.

On the other hand, a sheet type reflector made of a film sheet subjected to mirror surface processing by depositing aluminum (for example) is known. Said sheet type reflector has such an advantage that it needs no degreasing or other pretreatment for obtaining the mirror surface property. However, since the film sheet used in this case is made of polyethylene that has poor heat resistance, said sheet type reflector cannot be used as the reflector of the headlight using halogen bulb or other high heating lamp as far as the heat-resistant shape retaining property is concerned.

Also known is a reflecting mirror having a visible light reflecting an IR ray transmitting multi-layer film formed on a reflector base material made of polyimide resin and polyester ketone (for example, see patent reference 2). Such reflecting mirror is difficult to damage and has high resistance against heating of halogen bulb, etc. since the polyimide resin is used. However, since such reflecting mirror has a visible light reflecting IR ray transmitting multi-layer film formed on the base material, it cannot be used as the reflector for a headlight or fog light for automobile in practical application. Also, the characteristic of "having high resistance against the heating of halogen bulb, etc. since polyimide resin is used as the reflector base material" means long molding time since it is necessary to take long time to heat or cool off the die during molding. Therefore, it is unsuitable for practical application as far as cost and mass production are concerned. Besides, when a thermoplastic film with low glass transition point is used, the heat resistance is poor.

RELATED ART

[Patent Reference 1]: Japanese Kokoku Utility Model No. Sho 62[1987]-10887

[Patent Reference 2]: Japanese Kokoku Patent No. Hei 5[1993]-5 88481

SUMMARY OF THE INVENTION

The present invention was achieved as a result of the study conducted to solve the problems of the aforementioned conventional technologies.

Consequently, the first purpose of the present invention is to provide a polyimide film for molding that is light and has excellent surface smoothness, safety, moldability, heat resistance, and handleability.

The second purpose of the present invention is to provide a high-quality low-cost molding product, especially, a reflector or illuminating device, which needs no pretreatment during formation of the reflecting layer and is suitable for mass production, has light weight and high mirror surface property as well as excellent heat resistance, heat dissipating property, safety, and handleability.

In order to realize the aforementioned purposes, the present invention provides a polyimide film for molding made of a thermoplastic polyimide obtained from a reaction between an aromatic tetracarboxylic acid or its dianhydride and an aromatic diamine, characterized by the fact that the lowest viscoelasticity of storage elasticity (E') of viscoelasticity is $10^8$ Pa or lower, and the tensile elongation at glass transition temperature (E") A is 150% or higher.

The polyimide film for molding disclosed in the present invention is preferred to have the following conditions. The temperature difference B-A between glass transition temperature (E") A and the temperature B at which the lowest viscoelasticity (E') is present is 20-150° C. The film includes one or more ether bonds represented by the following equation (I) in the molecular structure of the aromatic tetracarboxylic dianhydride or the aromatic diamine.

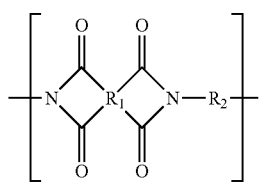
[Structure 1]

where $R_1$ represents one of the following groups:

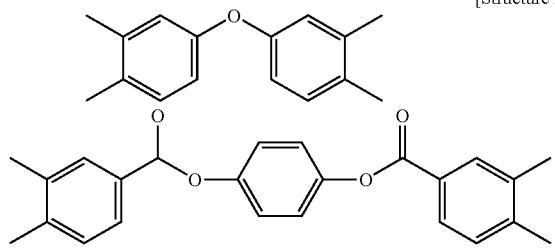
[Structure 2]

$R_2$ represents one of the following groups:

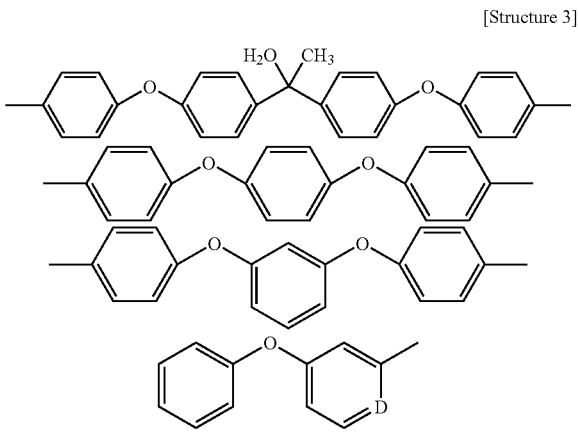
[Structure 3]

The film has excellent transferability with transfer percentage of 80% or higher when the h (height)/D (length of one side) of a square pyramid-shaped die used for moldability evaluation is 0.75.

Also, the method for manufacturing said polyimide film for molding disclosed in the present invention is characterized by the fact that after the film is preheated at a temperature higher than the glass transition temperature (E") of the film by 30° C. or more, molding is performed with the glass transition temperature (E") as the die temperature, followed by cooling to a temperature lower than glass transition temperature (E") by 10° C. or more, preferably, 50° C. and then removing the molding product.

The molding body of the present invention is characterized by using the aforementioned polyimide film for molding. It can display the best effect in the case of a reflector base material for illuminating machine having a main body part that forms the reflecting surface, an outer flange part, and an inner flange part.

As to be explained later, the present invention can provide a polyimide film for molding that is light and has excellent surface smoothness, safety, moldability, heat resistance, and handleability.

Also, the present invention can provide a high-quality low-cost molding product, especially, a reflector or illuminating device, which needs no pretreatment during formation of the reflecting layer and is suitable for mass production, has light weight and high mirror surface property as well as excellent heat resistance, heat dissipating property, safety, and handleability.

BEST EMBODIMENTS OF THE INVENTION

In the following, the present invention will be explained in more detail.

First, the polyimide film for molding disclosed in the present invention will be explained.

The polyimide film for molding disclosed in the present invention is made of a thermoplastic polyimide obtained from a reaction between an aromatic tetracarboxylic acid or its dianhydride and an aromatic diamine. It is characterized by the fact that the lowest viscoelasticity of storage elasticity (E') of viscoelasticity is $10^8$ Pa or lower, and the tensile elongation at glass transition temperature (E") A is 150% or higher.

If the lowest viscoelasticity of the film exceeds $10^8$ Pa, the softness will be absent, and the transferability becomes poor. If the tensile elongation at glass transition temperature (E") A is less than 150%, the film cannot be well formed by means of deep-drawing molding, and the transferability tends to deteriorate.

Also, for the polyimide film for molding disclosed in the present invention, the temperature difference B-A between glass transition temperature (E") A and the temperature B at which the lowest viscoelasticity (E') is present is preferred to be in the range of 20-150° C. in consideration of the productivity, transferability, and heat resistance of the film.

It is preferred to manufacture the polyimide used for forming the polyimide film for molding of the present invention by closing the ring of a polyamic acid having the weight average molecular weight of 1 unit of 420 or larger. As far as the chemical structure of the polyimide film is concerned, it is preferred to contain the structural unit represented by said equation (I). It is more preferred that the content of said structural unit be 50% or more of all of the structural units. There is no special limitation on other structural units.

The aromatic polyimide film of the present invention can be manufactured using the conventional method. For example, after a polyamic acid is cast in a solution state on a support to form a polyamic acid film with self-support property, said polyamic acid is heated and imidized to form said polyimide film.

The aforementioned polyamic acid solution is obtained by polymerizing one or more kinds of diamine components and one or more kinds of tetracarboxylic dianhydrides.

The polyamic acid solution can be polymerized using the following methods. In one method, after a diamine compound is added into a solvent and mixed for an appropriate period of time needed for the reaction in which the content of one or more kinds of tetracarboxylic dianhydrides is in the range of 95-105 mol % with respect to the reaction components, more diamine compound is added. Then, one or more kinds of tetracarboxylic dianhydrides are added, and polymerization is carried out until the amount of all of the diamine components is almost the same as that of all of the tetracarboxylic dianhydride components. In another method, after one or more kinds of tetracarboxylic dianhydrides are added into a solvent and mixed for an appropriate period of time needed for the reaction in which the content of the diamine compound is in the range of 95-105 mol % with respect to the reaction components, one or more kinds of tetracarboxylic dianhydrides are added. Then, diamine compound is added, and polymerization is carried out until the amount of all of the diamine components is almost the same as that of one or more kinds of tetracarboxylic dianhydride components.

Examples of said polyamic acid can be obtained by polymerizing diaminodiphenyl-ether, 1,3-bis-(4-aminophenoxy) benzene, 2-2-bis[4-(4-aminophenoxy)phenyl]propane, 4,4'-bis(4-aminophenoxy)biphenyl, 1,4-bis(4-aminophenoxy) benzene, phenylene diamine, or other aromatic diamine components and pyromellitic dianhydride or other pyromellitic acids or 3,3'-4,4'-biphenyl tetracarboxylic acid or its dianhydride or 3,3'-4,4'-benzophenone tetracarboxylic acid or its dianhydride or other aromatic tetracarboxylic acid type compounds having two or more benzene rings in a solvent. Said polyamic acid can be used to generate thermoplastic polyimide.

Examples of the solvent used in said polymerization include dimethyl sulfoxide, N,N-dimethylacetamide, N,N-diethyl acetoamide, N,N-dimethyl formamide, N,N-diethyl formamide, N-methyl-2-pyrrolidone, and dimethyl sulfone, which can be used either alone or as a mixture of several types.

The polyamic acid obtained from said polymerization is usually adjusted to a proportion in the range of 10-30 wt % in said solvent.

As far as the transfer percentage is concerned, four kinds of molding bodies with h (height)ld (length of one side) ratio of 0.5, 0.75, 1.0, 1.5 are obtained using square pyramid shaped dies for evaluating moldability with a fixed height and different lengths of one side. The ratio of the height h of the molding body to the height h' of the die is taken as the transfer percentage. Transfer percentage (%)=h height of the molding product/h' (height of die)×100.

In the following, an example of manufacturing the polyimide film for molding of the present invention will be explained.

First, an extruding nozzle is used to cast a polyamic acid solution on a support to form a self-support polyamic acid film. Then, a heat treatment is performed at a temperature in the range of 200-400° C. for the obtained polyamic acid film with its ends fixed to obtain a polyimide film.

In the heat treatment, it is preferred to perform biaxial stretching in order to improve the mechanical properties and isotropicity of the polyimide film. Although there is no special limitation on the stretching rate, the film is usually stretched by 1.05-1.5 times in the film traveling direction and by 1.5-2.0 times in the direction perpendicular to the film traveling direction.

Said casting means that the polyamic acid is spread on the support. An example of casting is the method that extrudes the polyamic acid from bar coater, spin coater, or a pipe-shaped object in any shape and spreads it on the support.

When the obtained polyamic acid is cyclized to obtain the thermoplastic polyimide film, it is possible to use a chemical ring closing method that performs dewatering using a dewatering agent and a catalyst and/or a thermal ring closing method that dewaters thermally.

Examples of the dewatering agent used in the chemical ring closing method include acetic anhydride or other fatty acid anhydrides, phthalic anhydride and other anhydrides, which can be used either alone or as a mixture of several kinds. Examples of the catalyst include pyridine, picoline, quinoline, or other heterocyclic tertiary amines, triethyl amine or other aliphatic tertiary amines, N,N-dimethyl aniline or other tertiary amines, which can be used either alone or as a mixture of several kinds.

Although there is no special limitation on the thickness of the polyimide film obtained as described above, it is preferred to be in the range of 25-250 μm, more preferably, in the range of 75-125 μm.

In the present invention, in the aforementioned manufacturing method, it is important that after the film is preheated at a temperature higher than the glass transition temperature (E") of the film by 30° C. or more, molding is performed with the glass transition temperature (E") as the die temperature, followed by cooling to a temperature lower than glass transition temperature (E") by 10° C. or more, preferably, 50° C. and then removing the molding product.

When the film molding temperature is made close to the temperature at which the cooled molding product can be removed after molding as described above, the time from molding to removal can be shortened, and the cost can be reduced.

Since the polyimide film for molding obtained this way is light and has excellent surface smoothness, safety, moldability, heat resistance, and handleability, it is suitable for use as a high-quality reflector, especially, a reflector for illuminating devices.

Also, since the molding body formed using the polyimide film for molding disclosed in the present invention needs no pretreatment during formation of the reflecting layer and is suitable for mass production, has light weight and high mirror surface property as well as excellent heat resistance, heat dissipating property, safety, and handleability, it is very useful as a lamp reflector for the headlight of an automobile, a dental mirror, and a surgery lamp.

APPLICATION EXAMPLES

In the following, the present invention will be explained in more detail with reference to application examples.

The various characteristics in the application examples are evaluated using the following methods.

[Storage Elasticity: E']

It was measured by EXTORA-6000 produced by Seiko Instruments Co., Ltd. at a frequency of 2 KHz and a heating rate of 2° C./min. The lowest point in the storage elasticity curve was taken as the lowest viscoelasticity.

[Glass Transition Temperature: Tg]

It was measured by EXTORA-6000 produced by Seiko Instruments Co., Ltd. at a frequency of 2 KHz and a heating rate of 2° C./min. The inflection point of the obtained loss elastic modulus curve E" was taken as Tg.

[Tensile Elongation]

An accurate universal material tester 2005 produced by Intesko Co., Ltd. was used in a tension test conducted for a Mitsui Chemical dumbbell sample piece. The stretching speed was 300 mm/min, and the test temperature was selected from 220, 270, 290, 320° C., whichever was the closest to the glass transition temperature of the film.

[Moldability Evaluation]

Each film was molded using four kinds of dies having different ratios h/d as shown in Table 2. Said ratio was the ratio of the fixed height of a square pyramid-shaped die to the length of one side. Comparison was made by performing vacuum plus pressure-assisted molding.

The standards for judging the moldability was O when the height (L) of the molding product/height of the die (LO)= 90% or higher, 0 when said ratio was 80% or higher, and X when said ratio was lower than that [80%].

The molding conditions were as follows.

Film preheating: Temperature at which the lowest viscoelasticity was present

Molding temperature: Tg (E") temperature
Removal temperature: Tg (E") −50° C.

Application Example 1

36.7 g (89.52 mmol) of 2,2-bis[4-(4-aminophenoxy)phenyl]propane and 230.823 g of N,N'-dimethylacetamide were added into a 500-mL separable flask equipped with a DC stirrer, followed by stirring performed at room temperature in a nitrogen atmosphere.

After 30 min, 11.538 g (35.80 mmol) of 3,4,3',4'-benzophenone tetracarboxylic dianhydride were added several times during 1 h (h=hour), followed by 1 h of stirring. Then, 11.129 g (51.03 mmol) of pyromellitic dianhydride were added several times. After 1 h of stirring, 9.763 g of a pyromellitic dianhydride N,N'-dimethylacetamide solution (6 wt %) were added dropwise during 30 min, followed by 1 h of stirring.

The obtained polyamic acid had a viscosity of 4000 poise. Part of the obtained polyamic acid was applied onto a polyester film, and a uniform film was formed using a spin coater. The film was immersed in—β-picoline/acetic anhydride mixture solution (50:50) for 5 min for imidization.

The obtained polyimide film was heated at 200° C. for 30 min, at 300° C. for 20 min, and at 400° C. for 5 min to obtain a polyimide film.

The thickness of the obtained film was 126 μm.

The obtained film was used to evaluate the moldability by means of vacuum/pressure molding and calculate the transferability. Also, the viscoelasticity, and high-temperature tension tests were carried out. The results are shown in Tables 1, 2.

Application Example 2

30.027 g (102.725 mmol) of 1,3-bis-(4-aminophenoxy) benzene and 229.506 g of N,N'-dimethylacetamide were added into a 500-mL separable flask equipped with a DC stirrer, followed by stirring performed at room temperature in a nitrogen atmosphere.

After 30 min, 25.492 g (82.18 mmol) of 4,4-oxydiphthalic dianhydride were added several times during 1 h, followed by 1 h of stirring. Then, 3.809 g (17.463 mmol) of pyromellitic dianhydride were added several times. After 1 h of stirring, 11.164 g of a pyromellitic dianhydride N,N'-dimethylacetamide solution (6 wt %) were added dropwise during 30 min, followed by 1 h of stirring.

The obtained polyamic acid had a viscosity of 4000 poise. Part of the obtained polyamic acid was applied onto a polyester film, and a uniform film was formed using a spin coater. The film was immersed in [3-picoline/acetic anhydride mixture solution (50:50) for 5 min for imidization.

The obtained polyimide film was heated at 200° C. for 30 min, at 300° C. for 20 min, and at 400° C. for 5 min to obtain a polyimide film. The thickness of the obtained film was 125 μm.

The obtained film was used to evaluate the moldability by means of vacuum/pressure molding and calculate the transferability. Also, the viscoelasticity, and high-temperature tension tests were carried out. The results are shown in Tables 1, 2.

Application Example 3

26.104 g (130.388 mmol) of 4,4'-diaminodiphenyl ester and 229.506 g of N,N'-dimethylacetamide were added into a 500-mL separable flask equipped with a DC stirrer, followed by stirring performed at room temperature in a nitrogen atmosphere.

After 30 min, 21.098 g (71.71 mmol) of 4,4-biphenyl tetracarboxylic dianhydride were added several times during 1 h, followed by 1 h of stirring. Then, 4.835 g (22.166 mmol) of pyromellitic dianhydride were added several times. After 1 h of stirring, 14.22 g of a pyromellitic dianhydride N,N'-dimethylacetamide solution (6 wt %) were added dropwise during 30 min, followed by 1 h of stirring.

The obtained polyamic acid had [a viscosity] of 3500 poise.

Part of the obtained polyamic acid was applied onto a polyester film, and a uniform film was formed using a spin coater. The film was immersed in [β-picoline/acetic anhydride mixture solution (50:50) for 5 min for imidization.

The obtained polyimide film was heated at 200° C. for 30 min, at 300° C. for 20 min, and at 400° C. for 5 min to obtain a polyimide film. The thickness of the obtained film was 127 μm.

The obtained film was used to evaluate the moldability by means of vacuum/pressure molding and calculate the transferability. Also, the viscoelasticity, high-temperature tension tests were carried out. The results are shown in Tables 1, 2.

Application Example 4

23.538 g (80.52 mmol) of 1,3-bis-(4-aminophenoxy)benzene and 229.506 g of N,N'-dimethylacetamide were added into a 500-mL separable flask equipped with a DC stirrer, followed by stirring performed at room temperature in a nitrogen atmosphere.

After 30 min, 31.459 g (97.63 mmol) of 3,4,3',4'-benzophenone tetracarboxylic dianhydride were added several times during 1 h, followed by 1 h of stirring. Then, 11.164 g of 3,4,3',4'-benzophenone tetracarboxylic dianhydride N,N'-dimethyl aceotamide solution (6 wt %) were added dropwise during 30 min, followed by 1 h of stirring.

The obtained polyamic acid had a viscosity of 4000 poise. Part of the obtained polyamic acid was applied onto a polyester film, and a uniform film was formed using a spin coater. The film was immersed in β-picoline/acetic anhydride mixture solution (50:50) for 5 min for imidization.

The obtained polyimide film was heated at 200° C. for 30 min, at 300° C. for 20 min, and at 400° C. for 5 min to obtain a polyimide film. The thickness of the obtained film was 125 μm.

The obtained film was used to evaluate the moldability by means of vacuum/pressure molding and calculate the transferability. Also, the viscoelasticity, and high-temperature tension tests were carried out. The results are shown in Tables 1, 2.

Comparative Example 1

A Capton EN (PMDA/BPDA//ODA/PPD) 100-μm-thick film produced by Toray-DuPont was used to measure the viscoelasticity and the high-temperature tensile elongation and evaluate the moldability using the dies.

Although the polymer structure contained ether bonds, the high-temperature elongation at Tg was low, and the transferability was poor. The results are shown in Tables 1 and 2.

Comparative Example 2

A Capton H (PMDA//ODA) 100-μm-thick film produced by Toray-DuPont was used to measure the viscoelasticity and the high-temperature tensile elongation and evaluate the moldability using the dies.

Since it was a non-thermoplastic polyimide, it did not show Tg or lowest viscoelasticity, and molding is impossible. The results are shown in Tables 1 and 2.

TABLE 1

| | Tg (E") | Temperature for the lowest viscoelasticity (E") | Tg (E") elongation | Moldability | AT |
|---|---|---|---|---|---|
| Application Example 1 | 271.9° C. | 9.8E+06 Pa 318° C. | 195 | ○ | 40 |
| Application Example 2 | 283.4° C. | 5.5E+07 Pa 430.2° C. | 160 | ○ | 147 |
| Application Example 3 | 225.3° C. | 1.8E+06 Pa 250° C. | 214 | ○ | 21 |
| Comparative Example 1 | 320.0° C. | 3.2E+08 Pa 399.5° C. | 65 | X | 80 |
| Comparative Example 2 | None | None | | Cannot be molded | — |

| | 0.5 | 1.5 | 1 | 0.75 |
|---|---|---|---|---|
| Application Example 1 | ⊚ | X | 73.84 | ○ |
| Application Example 2 | ⊚ | X | Break | ○ |
| Application Example 3 | ⊚ | X | ○ | ⊚ |
| Comparative Example 1 | ⊚ | X | 30.84 | X |
| Comparative Example 2 | Cannot be molded | Cannot be molded | Cannot be molded | Cannot be Molded |

○ = Acceptable
X = Unacceptable
⊚ = Excellent

INDUSTRIAL APPLICATION POSSIBILITY

Since the polyimide film for molding provided by the present invention is light and has excellent surface smoothness, safety, moldability, heat resistance, and handleability, it is suitable for use as a high-quality reflector, especially, a reflector for illuminating devices.

Also, since the molding body formed using the polyimide film for molding disclosed in the present invention needs no pretreatment during formation of the reflecting layer and is suitable for mass production, has light weight and high mirror surface property as well as excellent heat resistance, heat dissipating property, safety, and handleability, it is very useful as a lamp reflector for the headlight of an automobile, a dental mirror, and a surgery lamp.

What is claimed is:

1. A polyimide film for molding comprising: a thermoplastic polyimide obtained from a reaction between an aromatic tetracarboxylic acid or its dianhydride and an aromatic diamine, characterized by the fact that the lowest viscoelasticity of storage elasticity (E') of viscoelasticity is $10^8$ Pa or lower, and the tensile elongation at glass transition temperature (E") A is 150% or higher, wherein the polyimide film for molding is characterized by including one or more ether bonds represented by the following structure:

[Structure 1]

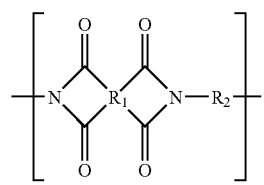

where $R_1$ represents one of the following groups:

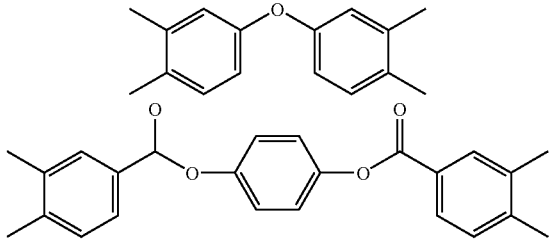

and $R_2$ represents one of the following groups:

[Structure 2]

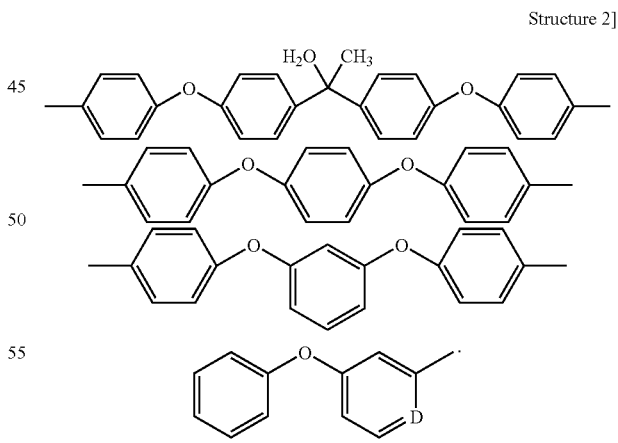

2. The polyimide film for molding described in claim 1, wherein the temperature difference B-A between glass transition temperature (E") A and the temperature B at which the lowest viscoelasticity (E') is present is 150° C. or less, and wherein the polyimide film provides excellent transferability with a transfer percentage of 80% or higher when the h (height)/D (length of one side) of a square pyramid-shaped die used for moldability evaluation is 0.75.

3. A method for manufacturing a polyimide film for molding described in claim 1, wherein the film is preheated at a temperature higher than the glass transition temperature (E") of the film by 30° C. or more, molding is performed with the glass transition temperature (E") as the die temperature, followed by cooling to a temperature lower than glass transition temperature (E") by 10° C. or more, and then removing the molding product.

4. A film according to claim 1 molded into a reflector base material.

* * * * *